US012711009B2

(12) United States Patent
Acharya et al.

(10) Patent No.: US 12,711,009 B2
(45) Date of Patent: Aug. 18, 2026

(54) DETECTING AND REPAIRING RELIABILITY ISSUES IN OPERATING SYSTEMS AND APPLICATIONS USING A GENERATIVE ARTIFICIAL INTELLIGENCE SYSTEM

(71) Applicant: Microsoft Technology Licensing, LLC, Redmond, WA (US)

(72) Inventors: Rajeev Prabhu Acharya, Redmond, WA (US); Siamak Ahari, Seattle, WA (US); Vinay Rao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 53 days.

(21) Appl. No.: 18/507,287

(22) Filed: Nov. 13, 2023

(65) Prior Publication Data

US 2025/0045148 A1 Feb. 6, 2025

Related U.S. Application Data

(60) Provisional application No. 63/516,852, filed on Jul. 31, 2023.

(51) Int. Cl.
*G06F 11/00* (2006.01)
*G06F 8/70* (2018.01)
(Continued)

(52) U.S. Cl.
CPC ............ *G06F 11/0793* (2013.01); *G06F 8/70* (2013.01); *G06F 11/0766* (2013.01); *G06F 11/3604* (2013.01)

(58) Field of Classification Search
CPC .... G06F 8/70; G06F 11/0766; G06F 11/0793; G06F 11/3604
See application file for complete search history.

(56) References Cited

U.S. PATENT DOCUMENTS 11,379,294 B1 7/2022 Hocken
2015/0089297 A1* 3/2015 Johnson ............. G06F 11/3698 714/38.1

(Continued)

OTHER PUBLICATIONS

International Search Report and Written Opinion received for PCT Application No. PCT/US2024/036476, Nov. 4, 2024, 14 pages.

(Continued)

*Primary Examiner* — Joshua P Lottich

(57) ABSTRACT

Examples of the present disclosure describe systems and methods for automatically detecting and repairing reliability issues in operating systems and applications using a generative artificial intelligence ("AI") system. In examples, a generative AI system receives a request to evaluate a detected issue in a software service or application. In response, the system analyzes error information associated with the detected issue to build an error context for the software code that caused the detected issue. The error context is used to identify the location of the software code file that comprises the software code. The error context and the software code file are used to identify a prompt. The prompt, the error context, and/or the identified software code are provided as input to a language model. The language model provides an output that is responsive to the user request and may perform actions to further evaluate or repair the detected issue.

20 Claims, 10 Drawing Sheets

(51) Int. Cl.
*G06F 11/07* (2006.01)
*G06F 11/3604* (2025.01)

(56) References Cited

U.S. PATENT DOCUMENTS

| | | | | |
|---|---|---|---|---|
| 2019/0155591 | A1* | 5/2019 | Kumar | G06F 11/34 |
| 2022/0229720 | A1* | 7/2022 | Kantharaj | G06F 11/3476 |
| 2023/0267066 | A1* | 8/2023 | Ross | G06F 11/3616<br>714/38.1 |
| 2024/0184566 | A1* | 6/2024 | Gabel | G06F 8/70 |
| 2025/0004450 | A1* | 1/2025 | Anthony | G05B 19/4184 |
| 2025/0044991 | A1* | 2/2025 | Darji | G06F 9/5083 |

OTHER PUBLICATIONS

Xia, et al., “Keep the Conversation Going: Fixing 162 out of 337 bugs for $0.42 each using ChatGPT”, Retrieved from: https://arxiv.org/abs/2304.00385, Apr. 1, 2023, 12 Pages.

International Preliminary Report on Patentability (Chapter I) received for PCT Application No. PCT/US2024/036476, Mailed on Feb. 12, 2026, 10 Pages.

* cited by examiner

DETECTING AND REPAIRING RELIABILITY ISSUES IN OPERATING SYSTEMS AND APPLICATIONS USING A GENERATIVE ARTIFICIAL INTELLIGENCE SYSTEM

CROSS-REFERENCE TO RELATED APPLICATIONS

This application claims the benefit of U.S. Provisional Application No. 63/516,852 filed Jul. 31, 2023, entitled "Detecting and Repairing Reliability Issues in Operating Systems and Applications Using a Generative Artificial Intelligence System," which is incorporated herein by reference in its entirety.

BACKGROUND

Software debugging solutions enable errors or "bugs" in software source code to be detected and repaired. Historically, such software debugging solutions require software developers to manually investigate the source code to determine which lines of the source code caused a detected error. The users must then manually repair the determined lines of source code. This manual debugging process requires the user to understand the intent of the source code and to possess the technical aptitude to repair the determined lines of source code. As such, the manual debugging process is often time-consuming and is prone to human error.

It is with respect to these and other general considerations that the aspects disclosed herein have been made. Also, although relatively specific problems may be described, it should be understood that the examples should not be limited to solving the specific problems identified in the background or elsewhere in this disclosure.

SUMMARY

Examples of the present disclosure describe systems and methods for automatically detecting and repairing reliability issues in operating systems and applications using a generative artificial intelligence ("AI") system. In examples, a generative AI system receives a request to evaluate a detected issue in a software service or application. In response to receiving the request, the generative AI system analyzes error information associated with the detected issue in order to build an error context for the portion of software code that caused the detected issue. The error context is used to identify the location of the software code file that comprises the portion of the software code that caused the detected issue. The error context and lines of software code from the software code file are used to determine an input prompt ("prompt"). The prompt, the error context, and/or the lines of software code are provided as input to a language model. Based on the type of evaluation indicated by the request, the language model processes the input and provides a corresponding output. The generative AI system then provides the output to the requestor and/or performs one or more actions to further evaluate or repair the detected issue.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Figure 1:
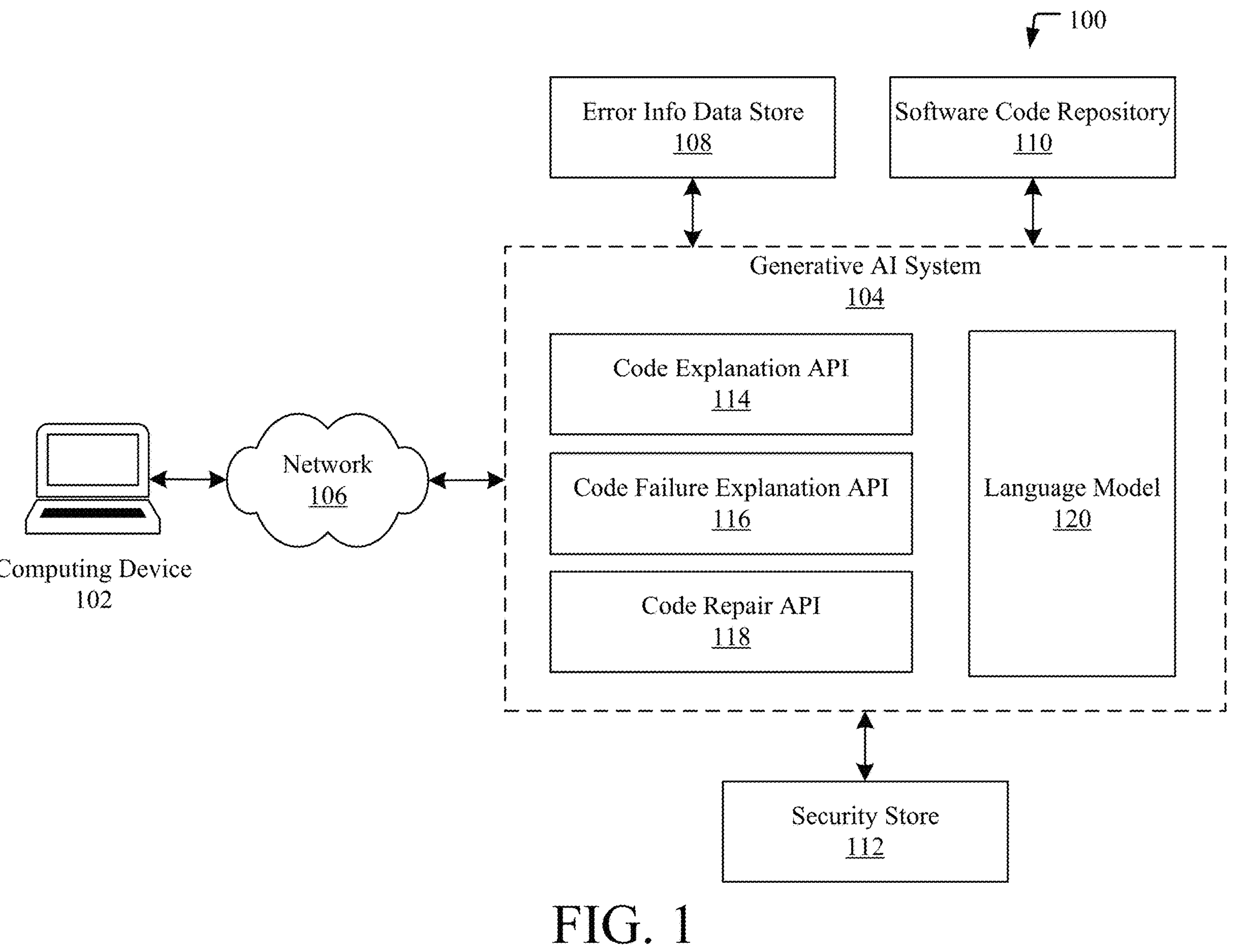
FIG. 1 illustrates an example system for automatically detecting and repairing reliability issues in operating systems and applications using a generative AI system.

Historically, software debugging solutions have required users, such as software developers and administrators, to manually investigate detected issues in software services or applications. A detected issue may correspond to the abnormal termination or performance degradation of a service or application (or features thereof), or unexpected and/or detrimental behavior by the service or application. In some examples, such issues are indicated by or included within error files, such as memory dumps of processes and kernel memory space. A memory dump refers to a file containing the recorded state of a computing device's working memory at a specific point in time, such as the time an application or system crashed or otherwise terminated abnormally. In other examples, such issues are indicated by or included within other types of error files, such as incident reports, event logs, and other types of software dumps (e.g., core dumps, crash dumps, storage dumps, system dumps, or abnormal end ("ABEND") dumps).

In instances in which the user is unfamiliar with the identified software code file or the portion of the software code (e.g., the user did not write the code, the user wrote the code long ago, or the code has been modified by others), the user may spend a significant amount of time determining the intent of the portion of the software code. After forming an understanding of the portion of the software code, the user must attempt to repair and subsequently test the portion of the software code. Repairing and testing the portion of the software code may also require a significant amount of time and introduces the possibly of incorporating new errors into the software code file.

The present disclosure provides a solution to the above-described deficiencies of previous software debugging solutions. Embodiments of the present disclosure describe systems and methods for automatically detecting and repairing reliability issues in operating systems and applications using a generative AI system. In examples, a generative AI system implementing a language model receives a user request to evaluate software code associated with a detected issue in a software service or application. However, in other examples, the user request is to evaluate software code that is not associated with a detected issue in a software service or application. In some examples, the language model is a large language model ("LLM"). An LLM refers to a machine learning model that is trained and fine-tuned on a large corpus of media (e.g., text, audio, video, or software code), and that can be accessed and used through an application programming interface (API) or a platform. An LLM performs a variety of tasks, including generating and classifying media, answering user requests and questions in a conversational manner, and translating text from one language to another.

In a first example, the user request is for the generative AI system to explain to a user, in natural language (e.g., conversational language), the intent of specified software code of the software service or application. For instance, a developer that is evaluating a memory dump may request the generative AI system to explain a function that is indicated in the memory dump to have failed during execution of the software service or application. In response to receiving the request to explain the software code, the generative AI system analyzes any error information associated with the detected issue to determine the portion of software code that caused or contributed to the detected issue ("failing portion of software code"). In examples, a portion of software code causes the detected issue if the failure of the portion of software code directly caused the detected issue to occur. In contrast, a portion of software code contributes to the detected issue if the failure of the portion of software code does not, by itself, cause the detected issue to occur. For instance, if the portion of software code is one among multiple portions of software code that failed, and the failure of a software service or application was caused by the collective failure of the portions of software code, then each portion of software code is considered to have contributed to (not caused) the detected issue. Error information includes exception text (e.g., error messages, an error hash, and contextual error details), call stack information (e.g., information identifying functions and subroutines executed while an application or service is active), and other debugging information (e.g., a commit identifier representing the state of a software code repository when a software code file was last merged to software codebase, an identifier of a software code file associated with a portion of software code, or a date/time of a detected issue).

The generative AI system uses the error information to build an error context for the failing portion of software code. An error context refers to a set of data relating to a detected error or issue in a software service or application. The set of data may include information that can be used to identify the failing portion of software code, such as the name (or other identifier) of the failing portion of software code or the name (or other identifier) of a software code file comprising the failing portion of software code. The set of data may also include information that can be used to evaluate the failing portion of software code, such as a revision history for the failing portion of software code, one or more software dependency relationships of the software service or application and/or of the failing portion of software code, call stack information or other event information, exception text associated with the detected issue, and the date/time of the detected issue. In examples, the error context is embodied as a data structure in memory or a file. Although this first example is primarily discussed in the context of evaluating a failing portion of software code, the user request to explain the intent of the specified software code is also applicable to software code that has not failed. For instance, a developer may simply desire to understand new or unfamiliar software code or may want to verify that recently modified software code is configured for a specific purpose.

The generative AI system uses the error context to identify a location of the software code file that comprises the failing portion of software code. In some examples, locating the software code file comprises using one or more symbol files to map memory addresses of the software service or application experiencing the detected issue to the software code file. A symbol file refers a file that contains data that is not required when running executable code files, but may be useful during the debugging process, such as global variables, local variables, function names, entry point addresses of functions, frame pointer omission (FPO) records, and source line numbers. Upon identifying the location of the software code file, the generative AI system identifies or extracts at least the lines of software code corresponding to the failing portion of software code. For instance, the generative AI system may match an identifier of the failing portion of software code, such as a function name, to one or more instances of a corresponding identifier in the software code file using pattern matching techniques, such as regular expressions or fuzzy logic. Upon identifying one or more instances of the identifier in the software code file, the pattern matching techniques may further determine which of the instances of the identifier represents the software code declaration for the failing portion of software code. The software code declaration is a construct that determines the identifier of software code and specifies information such as accepted input parameters and a data return type for the software code. In examples, the pattern matching techniques determine the software code declaration based on an expected format for the software code declaration. For instance, a particular software code declaration format may define that an identifier of software code is followed by one or parentheses and/or brackets enclosing the body of the software code. In some examples, the generative AI system also identifies or extracts additional lines of software code surrounding the lines of software code corresponding to the failing portion of software code. The additional lines of software code may enable the language model to form a more comprehensive understanding of the failing portion of software code.

The generative AI system identifies a prompt to be provided to the language model based on the user request to explain the intent of the specified software code. A prompt refers to input (e.g., text, speech or other types of media) that is presented to a language model to indicate an intention of a user request. Identifying the prompt may include selecting the prompt from an existing list of candidate prompts. For instance, each prompt in a list of candidate prompts may be mapped to or otherwise associated with a set of one or more terms or a usage scenario such that a candidate prompt is selected based on a match between terms in the user request and the set of one or more terms or the usage scenario. Alternatively, identifying the prompt may include dynamically generating the prompt in response to receiving the user request to explain the intent of the specified software code. For instance, the terms in the user request may be analyzed using semantic analysis techniques (e.g., sentiment analysis, named entity recognition, topic classification) and used to dynamically generate a prompt comprising one or more of the terms, related terms, and/or a topic related to the terms.

Along with the prompt, the generative AI system provides the error context and the lines of software code corresponding to and/or surrounding the failing portion of software code as input to the language model. In some examples, one or more previous user requests and/or language model responses representing turns of a dialogue between a user and the language model may also be provided as input to the language model. For instance, one or more dialogue entries (e.g., requests and responses) that are within a particular dialogue scope (e.g., relating to the same topic) may be provided to the language model. Providing the previous dialogue requests and responses as input enables the language model to provide current responses that are within the context of an ongoing conversation. The language model processes the received input and outputs an explanation of the specified software code. In examples, the explanation of the software code describes, in natural language, the intent of the software code and/or processing steps performed by the software code. The generative AI system then provides the explanation of the software code to the user in fulfillment of the user request.

In a second example, the user request is for the generative AI system to explain to a user, in natural language, the cause of the detected issue in the software service or application. For instance, a developer evaluating a failing portion of software code may request the generative AI system to explain the cause of failure for the failing portion of software code. As discussed in the first example, the generative AI system creates an error context for the failing portion of software code and identifies or extracts lines of software code corresponding to and/or surrounding the failing portion of software code. The generative AI system identifies a prompt to be provided to the language model based on the user request to explain the cause of the detected issue in the software service or application. The prompt, the error context, the lines of software, and/or previous dialogue requests and responses are provided as input to the language model. The language model processes the received input and outputs an explanation of the cause of the detected issue in the software service or application. In examples, the explanation of the detected issue describes, in natural language, the cause of failure for the failing portion of software code. The generative AI system then provides the explanation of the cause of the detected issue to the user in fulfillment of the user request.

In a third example, the user request is for the generative AI system to provide to a user, in natural language, an explanation of a proposed solution to repair the detected issue in the software service or application. For instance, a developer evaluating a failing portion of software code may request the generative AI system to provide an explanation of a corrective modification that could be applied to the failing portion of software code to resolve the detected issue. As discussed in the previous examples, the generative AI system creates an error context for the failing portion of software code and identifies or extracts lines of software code corresponding to and/or surrounding the failing portion of software code. The generative AI system identifies a prompt to be provided to the language model based on the user request to provide an explanation of a proposed solution to repair the detected issue in the software service or application. The prompt, the error context, the lines of software, and/or previous dialogue requests and responses are provided as input to the language model. The language model processes the received input and outputs an explanation of a proposed solution to repair the detected issue in the software service or application. In examples, the explanation of the proposed solution describes, in natural language, one or more approaches for performing modifications to the failing portion of software code and/or to other software code in the software code file comprising the failing portion of software code. Each approach may include one or more sequential steps. The generative AI system then provides the explanation of the proposed solution to the user in fulfillment of the user request.

In a fourth example, the user request is for the generative AI system to provide to a user a proposed solution (e.g., a software code fix) to repair the detected issue in the software service or application. For instance, a developer evaluating a failing portion of software code may request the generative AI system to provide a repaired version of the failing portion of software code. As discussed in the previous examples, the generative AI system creates an error context for the failing portion of software code and identifies or extracts lines of software code corresponding to and/or surrounding the failing portion of software code. The generative AI system identifies a prompt to be provided to the language model based on the user request to provide a proposed solution to repair the detected issue in the software service or application. The prompt, the error context, the lines of software, and/or previous dialogue requests and responses are provided as input to the language model. The language model processes the received input and outputs a proposed solution to repair the detected issue in the software service or application. In one example, the proposed solution includes a repaired version of the failing portion of software code. The repaired version of the software code may include an indication of lines of software code that have been modified (e.g., added, removed, or updated) as part of the repair process. The repaired version of the software code may also include a summary of the repairs performed on the failing portion of software code. The generative AI system then provides the proposed solution to the user in fulfillment of the user request.

In a fifth example, the user request is for the generative AI system to generate a pull request (e.g., a merge request) associated with a proposed solution for the detected issue in the software service or application. For instance, a developer reviewing a portion of software code (e.g., a failing portion of software code or a repaired version of software code) may request the generative AI system to generate a pull request for the software code. A pull request refers to a request to merge a first version of software code to a second version of software code. As one example, a pull request may indicate an intent to merge software code from a feature branch of a codebase to a repository comprising the main branch of the main codebase. As discussed in the previous examples, the generative AI system creates an error context for a failing portion of software code. Alternatively, the generative AI system creates a software context for the repaired version of software code. A software context refers to a set of data relating to the functionality of or a storage location for a repaired version of software code. The set of data may include information that can be used to identify the repaired version of software code, such as the name (or other identifier) of the repaired version of software code or the name (or other identifier) of a software code file comprising a version of the software code. The set of data may also include other information, such as the results of any test cases used to test the repaired version of software code, a revision history for the repaired version of software code, the date/time the repaired version of software code was created or modified, or a storage location of a software code file into which the repaired version of the software code is to be implemented.

The generative AI system identifies a prompt to be provided to the language model based on the user request to generate a pull request. The prompt, the error or software context, the proposed solution for the detected issue (e.g., the repaired version of software code), and/or previous dialogue requests and responses are provided as input to the language model. The language model processes the received input and outputs a pull request for the proposed solution. In some instances, the language model may also output (or the generative AI system may alternatively determine) one or more test cases intended to be used to test the proposed solution. The generative AI system then provides the pull request and may provide test cases to the user in fulfillment of the user request.

Accordingly, embodiments of the present disclosure provide for automatically detecting and fixing reliability issues in operating systems and application software code. By using language models, such as LLMs, to automatically analyze reliability issues in error files collected from devices experiencing reliability issues and utilizing the results of the automated analysis to engineer an automated solution via AI to fix the reliability issues, the embodiments discussed herein reduce application and platform stability issues. These embodiments also proactively reduce software surface areas that can be exploited for security loopholes and nefarious purposes.

FIG. 1 illustrates an example system for automatically detecting and repairing reliability issues in operating systems and applications using a generative AI system. System 100, as presented, is a combination of interdependent components that interact to form an integrated whole. Components of system 100 may be hardware components or software components (e.g., APIs, modules, runtime libraries) implemented on and/or executed by hardware components of system 100. In one example, components of system 100 are implemented on a single computing device. In another example, components of system 100 are distributed across multiple computing devices and/or computing systems.

In FIG. 1, system 100 comprises user device 102, generative AI system 104, network 106, error information data store 108, software code repository 110, and security store 112. Although system 100 is depicted as comprising a particular combination of computing devices and components, the scale and structure of devices and components described herein may vary and may include additional or fewer components than those described in FIG. 1. Further, although examples in FIG. 1 and subsequent figures will be described in the context of detecting and repairing reliability issues in operating systems and applications, the examples are equally applicable to other contexts. For instance, one or more of the examples are also applicable in the context of evaluating software code and other types of data that have not experienced reliability issues.

User device 102 detects and/or collects input data from users and user devices via one or more sensor components of user device 102. Examples of sensors include microphones, touch-based sensors, geolocation sensors, accelerometers, optical/magnetic sensors, gyroscopes, keyboards, and pointing/selection tools. In some examples, the input data is not input by a user of user device 102. Instead, user device 102 receives or collects the input data from an application, a service, a storage location (e.g., a database or a file repository), or the like accessible to user device 102. The input data includes, for example, text-based input, audio input, touch input, gesture input, image input, user signals, and/or network signals. In some examples, the input data corresponds to user interaction with software applications or services implemented by, or accessible to, user device 102. For instance, user device 102 may provide a graphical user interface that enables users to interact with software applications or services, such as software debugging and analysis applications, software creation and storage services, language model services, search engines, word processing applications, database services, and the like. In other examples, the input data corresponds to automated interaction with the software applications or services, such as the automatic (e.g., non-manual) execution of scripts or sets of commands at scheduled times or in response to predetermined events. In either scenario, the interaction (e.g., user or automated) may be related to the performance of user activity corresponding to a task, a project, or a data request. Examples of user device 102 include personal computers (PCs), mobile devices (e.g., smartphones, tablets, laptops, personal digital assistants (PDAs)), and wearable devices (e.g., smart eyewear).

User device 102 provides received input data to generative AI system 104. In some examples, the input data is provided to generative AI system 104 without using network 106. For instance, generative AI system 104 or one or more components thereof may be implemented directly on user device 102. In other examples, user device 102 transmits the input data to generative AI system 104 via network 106. Examples of network 106 include a wide area network (WAN), a local area network (LAN), and a private area network (PAN). Although network 106 is depicted as a single network, it is contemplated that network 106 may represent several networks of similar or varying types. It is further contemplated that network 106 may be used by generative AI system 104 to interact with one or more of error information data store 108, software code repository 110, or security store 112.

Generative AI system 104 provides a set of APIs and functionality that improves the traditional software debugging and analysis experience for users by providing contextually relevant AI and machine learning (ML)-based insights and actionable functions during the debugging and software analysis process. For instance, generative AI system 104 provides functionality enabling users to request, among other things, an explanation of the operations executed by software code, an explanation of a cause of failure of software code, an explanation of a proposed solution for correcting software code, revised software code (e.g., software code that has been updated to correct an error or to optimize the software code), a pull request for software code, and software test cases for testing the execution of software code. In examples, generative AI system 104 is implemented in a remote cloud-based or server-based environment using one or more computing devices, such as server devices (e.g., web servers, file servers, application servers, database servers), personal computers (PCs), virtual devices, and mobile devices. In other examples, generative AI system 104 is implemented in a local (e.g., on-premises) computing environment, such as in a home or in an office. Generative AI system 104 comprises hardware and/or software components and may be subject to one or more distributed computing models/services (e.g., Infrastructure as a Service (IaaS), Platform as a Service (PaaS), Software as a Service (SaaS), Functions as a Service (FaaS)).

In FIG. 1, generative AI system 104 comprises code explanation API 114, code failure explanation API 116, code repair API 118, and language model 120. Although code explanation API 114, code failure explanation API 116, and code repair API 118 are depicted as separate APIs, it is contemplated that one or more of code explanation API 114, code failure explanation API 116, and code repair API 118 (or the functionality thereof) may be incorporated into one or more APIs. For instance, a single API may incorporate the functionality of code explanation API 114, code failure explanation API 116, and code repair API 118. Alternatively, the functionality of one of code explanation API 114, code failure explanation API 116, or code repair API 118 may be distributed among one or more of the other APIs. An API, as used herein, refers to software that provides a means for two or more computer programs (e.g., applications or services) to communicate with each other. In examples, an API abstracts the underlying implementation of the API by exposing certain objects or actions to a user.

In some examples, one or more of code explanation API 114, code failure explanation API 116, code repair API 118, and language model 120 may be integrated into a separate application or service, such as a debugging and/or analysis application, a software code editing and management service, or a software version control system. In such examples, code explanation API 114, code failure explanation API 116, and code repair API 118, and language model 120 may be invoked via a user interface provided by or exposed to user device 102. For instance, code explanation API 114, code failure explanation API 116, and code repair API 118 may be invoked via user input corresponding to a selection of a document element or a user interface element (e.g., a button, a hyperlink, or a menu option) in a document, an application interface, or a web browser of user device 102. Alternatively, code explanation API 114, code failure explanation API 116, and code repair API 118 may be invoked via user input provided directly to language model 120 via a command line interface of user device 102. For instance, in response to receiving a user request, language model 120 may invoke one or more of code explanation API 114, code failure explanation API 116, or code repair API 118.

Code explanation API 114 provides functionality that enables a user to request a natural language explanation of an indicated portion of software code. In examples, code explanation API 114 generates or causes the generation of a context for the portion of software code. If the portion of software code is associated with a detected issue, an error context is generated for the portion of software code. However, if the portion of software code is not associated with a detected issue, a software context is generated for the portion of software code. Based on the context (e.g., error context or software context) for the portion of software code, code explanation API 114 identifies a software code file comprising the portion of software code and extracts lines of software code corresponding to the portion of software code from the software code file. Code explanation API 114 identifies a prompt intended to solicit an explanation of the portion of software code. Code explanation API 114 then provides the context, the lines of software code, the prompt, and one or more previous dialogue entries (if applicable) to language model 120.

Code failure explanation API 116 provides functionality that enables a user to request a natural language explanation of the cause of failure for an indicated portion of software code. In some examples, code failure explanation API 116 generates or causes the generation of a context for a failing portion of software code and extracts lines of software code corresponding to the failing portion of software code from a corresponding software code file, as discussed above with respect to code explanation API 114. In other examples, code failure explanation API 116 retrieves the context for a failing portion of software code and the lines of software code corresponding to the failing portion of software code from previous dialogue entries of an ongoing conversation between a user and language model 120. For instance, during a first turn of a dialogue between a user and language model 120, a first user request for an explanation of an indicated portion of software code is submitted to generative AI system 104. The first user request invokes code explanation API 114, which causes an error context and lines of software code corresponding to the indicated portion of software code to be provided to language model 120. During a second turn of the dialogue between the user and language model 120, a second user request for an explanation of the cause of failure for the indicated portion of software code is submitted to generative AI system 104. The second user request invokes failure explanation API 116, which, instead of regenerating the error context and extracting the lines of software code for the indicated portion of software code, retrieves the existing error context and lines of software code for the indicated portion of software code from the dialogue history of language model 120.

After acquiring (e.g., generating of retrieving) the error context and the lines of software code for the indicated portion of software code, code failure explanation API 116 identifies a prompt intended to solicit an explanation of the cause of failure for the indicated portion of software code. Code failure explanation API 116 then provides the context, the lines of software code, the prompt, and one or more previous dialogue entries (if applicable) to language model 120.

Code repair API 118 provides functionality that enables a user to request a natural language explanation of a proposed solution to repair an indicated portion of software code. In some examples, code repair API 118 generates or causes the generation of a context for a failing portion of software code and extracts lines of software code corresponding to the failing portion of software code from a corresponding software code file, as discussed above with respect to code explanation API 114 and code failure explanation API 116. In other examples, code repair API 118 retrieves the context for a failing portion of software code and the lines of software code from previous dialogue entries of an ongoing conversation between a user and language model 120, as discussed above with respect to code failure explanation API 116. Code repair API 118 identifies a prompt intended to solicit an explanation of the proposed solution to repair an indicated portion of software code. Code repair API 118 then provides the context, the lines of software code, the prompt, and one or more previous dialogue entries (if applicable) to language model 120.

Code repair API 118 also provides functionality that enables a user to request a proposed solution (e.g., a code fix) to repair an indicated portion of software code. In some examples, code repair API 118 acquires (e.g., generates or retrieves) error context and lines of software code for an indicated portion of software code, as discussed above. Code repair API 118 identifies a prompt intended to solicit the proposed solution to repair the indicated portion of software code. Code repair API 118 then provides the context, the lines of software code, the prompt, and one or more previous dialogue entries (if applicable) to language model 120.

Code repair API 118 further provides functionality that enables a user to request the generation and/or submission of a pull request associated with an indicated portion of software code. In some examples, code repair API 118 generates or causes the generation of a software context for the indicated portion of software code, as discussed above. Code repair API 118 identifies or extracts lines of software code corresponding to the indicated portion of software code. For instance, code repair API 118 may extract lines of software code from a repaired version of a failing portion of software code. Alternatively, code repair API 118 may acquire a software code file comprising the repaired version of the failing portion of software code. After acquiring the context and the lines of software code associated with the indicated portion of software code, code repair API 118 identifies a prompt intended to generate a pull request for the repaired version of the failing portion of software code. Code repair API 118 then provides the context, the lines of software code, the prompt, and one or more previous dialogue entries (if applicable) to language model 120.

Language model 120 is a machine learning model that is provides output in response to user requests from at least code explanation API 114, code failure explanation API 116, and code repair API 118. In examples, language model 120 is a generative AI model, such as an LLM, a software code generation model, an image generation model, or an audio generation model. A generative AI model refers to a model or algorithm that has a primary function of content generation, in contrast to AI models having other primary functions, such as data classification, data grouping, or action selection. Language model 120 is trained to interpret complex intent and cause and effect, and to interpret and generate sequences of tokens (parts of words), which may be in the form of natural language. Language model 120 is also trained to perform language translation, semantic search classification, complex classification, text sentiment, summarization, summarization for an audience, and/or other natural language functionality.

In some examples, language model 120 is implemented using a neural network, such as a deep neural network, that utilizes a transformer architecture to process received input. In other examples, language model 120 is implemented using an alternative ML model or a neural network that utilizes a different architecture, such as a convolutional neural network, a recurrent neural network, or an autoencoder. The neural network may include an input layer for receiving input, one or more hidden layers for performing computations associated with the input, and an output layer for providing a result for the input. In one example, the hidden layers include attention mechanisms that enable language model 120 to focus on specific portions of the input, and to generate context-aware outputs. Language model 120 may be trained based on supervised learning techniques using a large corpus of annotated and/or unannotated media. The corpus of annotated and/or unannotated media includes various software language formats and object definitions, software code examples in various software language, explanations of steps in software code or intents of the software code, software execution flows, explanations of errors and issues associated with software code, software code debugging examples, software code repair examples, explanations of software code repair procedures, pull request procedures and formats, example test cases, and/or other data related to detecting and repairing reliability issues in software code. In such embodiments, based on the supervised learning techniques, the language model 120 is trained to predict words or tokens (e.g., a next word or token) in a given text sequence.

In examples, the size and/or classification (e.g., language model versus LLM) of language model 120 is determined based on the number of words or tokens in the of the dataset used to train language model 120 or based on the number of parameters included in language model 120. For instance, the number of parameters for a language model (e.g., Bidirectional Encoder Representations from Transformers (BERT), Word2Vec, Global and Vectors (GloVe), Embeddings from Language Models (ELMo), or XLNet) may be in the millions (or less), whereas the number of parameters for an LLM (e.g., Generative Pre-trained Transformer (GPT)-3 or GPT-4, Large Language Model Meta AI (LLaMA) 2, BigScience Large Open-science Open-access Multilingual Language Model (BLOOM)) may be in the billions (or more). The parameters of language model 120 are numerical values representing weights and biases that collectively define the behavior of language model 120. Typically, larger numbers of parameters result in a more complex language model 120 that has a strong understanding of the structure and meaning of data, which enables language model 120 to efficaciously identify intricate patterns in the data.

In some examples, language model 120 receives input from code explanation API 114, code failure explanation API 116, and/or code repair API 118. For instance, code explanation API 114, code failure explanation API 116, and/or code repair API 118 may include one or algorithms that perform steps that create the input intended for language model 120. Code explanation API 114, code failure explanation API 116, and/or code repair API 118 then provide the input to language model 120 via a function or interface of the respective API. In other examples, language model 120 receives input from one or more other components of generative AI system 104. For instance, generative AI system 104 may comprise one or algorithms that perform steps responsive to a request received by or actions performed by code explanation API 114, code failure explanation API 116, and/or code repair API 118. At least a portion of the output or result of the one or algorithms may be formatted to match an expected format of input for the language model. The formatted or unformatted portion of the output or result of the one or algorithms is then provided to language model 120 via a function or interface accessible to the one or algorithms. The function or interface may be provided code explanation API 114, code failure explanation API 116, and/or code repair API 118. In at least example, language model 120 also receives input directly from a user via a command line interface of user device 102 or generative AI system 104.

In examples, language model 120 expects input comprising at least a prompt that includes a statement (e.g., one or more terms) or a request intended for language model 120. In some examples, language model 120 expects input to comprise additional information. The additional information expected in the input may be based on the statement or request included in the prompt. For instance, when the prompt includes a request to explain the intent of the specified software code, language model 120 expects the input to additionally include an error context for the specified software code and/or lines of software code corresponding to the specified software code. However, when the prompt includes a request to generate a pull request for specified software code, language model 120 expects the input to additionally include a software context for the specified software code, a proposed solution for a detected issue, and/or one or more previous dialogue requests and responses between a user and language model 120. In examples, language model 120 expects the input and/or each portion of the input (e.g., the prompt, the error context, the lines of software code) to be formatted in accordance with a particular schema or rule set and/or to be provided in a particular sequence. For example, the input may be limited to a particular number of terms or tokens, a prompt may be required to include or omit certain terms or tokens, an error context may be required to include an identifier of an error file, and lines of software code may have a maximum line limit. Additionally, the input may be expected to be provided such that the prompt is provided first, an error context or a software context is provided second, and so on.

Upon receiving input, language model 120 processes the input and outputs a response corresponding to a user request associated with the input. For instance, in response to receiving input from code explanation API 114 that is associated with a request for a natural language explanation of an indicated portion of software code, language model 120 outputs the natural language explanation to code explanation API 114. In another instance, in response to receiving input from code repair API 118 that is associated with a request to generate a pull request for an indicated portion of software code, language model 120 outputs the pull request to code repair API 118. Language model 120 may also output one or more test cases intended to be used to test the indicated portion of software code. The test cases may be included within the pull request or provided separately from the pull request.

Error information data store 108 is a storage location that comprises or otherwise has access to error files relating one or more types of media, such as software code. For instance, error information data store 108 may store error files, such as memory dumps, for one or more applications or services executing in system 100 or in another computing environment. Examples of error information data store 108 include data tables, databases, and file systems. In some examples, error information data store 108 provides a user interface that enables a user to interact with the error files associated with the error information. The user interface may enable a user to view or debug software code associated with error files. In at least one example, the user interface comprises a user interface element that enables code explanation API 114, code failure explanation API 116, code repair API 118, and/or language model 120 to be invoked directly from the user interface. For instance, when a user is reviewing an error file via the user interface, the user interface may provide a button used to request an explanation of a failing portion of software code that caused the creation of the error file. Upon selection of the button, code explanation API 114 may be invoked.

Software code repository 110 is a storage location that comprises or otherwise has access to software code files and software development assets, such as documentation, test cases, and software scripts. For instance, the software code repository 110 may comprise one or more codebases for various projects and organizations of system 100 or of another computing environment. In examples, software code repository 110 represents or is implemented by one or more services or devices that provide software version control, reporting capabilities, requirements management, project management, software build automation, and/or testing and release management capabilities.

Security store 112 is a storage location that comprises or otherwise has access to access information, such as encryption keys, digital certificates, and other secrets (e.g., passwords and privileged account credentials). In examples, the access information is used to access protected resources (e.g., documents, applications, services, containers, or systems). For instance, security store 112 may store access information for accessing generative AI system 104, error information data store 108, and/or software code repository 110. In some examples, security store 112 communicates with a security layer (not pictured) of system 100 to ensure that a user of user device 102 is authorized to access protected resources implicated by a user request provided by the user. For instance, a security layer implemented by user device 102 (or by any other component of system 100) may interrogate security store 112 to determine whether a user is authorized to access a particular error file stored in error information data store 108 or a particular software code file stored in software code repository 110. If the security layer determines that security store 112 does not include or have access to requisite access information for accessing a protected resource, the security layer may prevent access to the protected resource.

Figure 2:
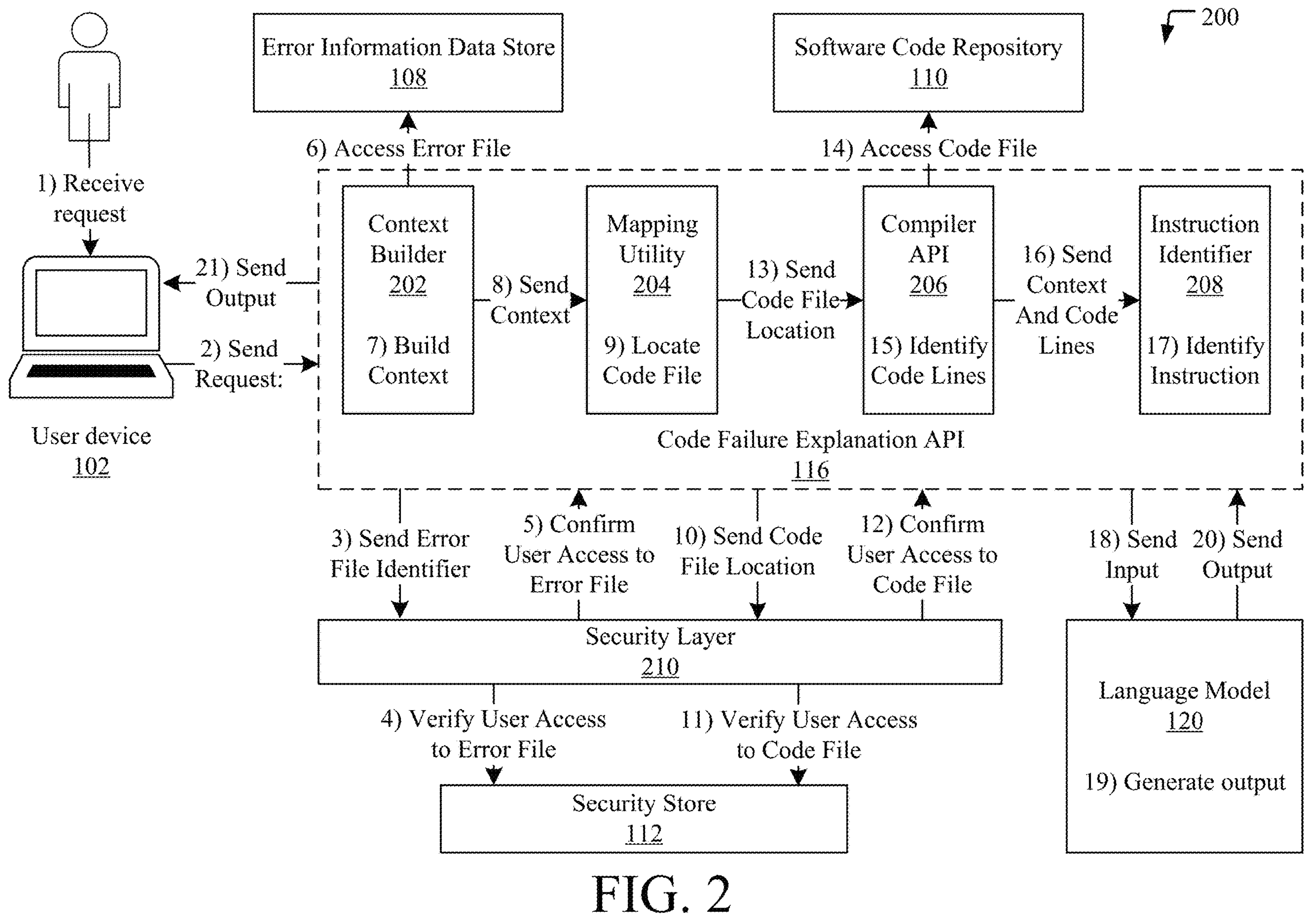
FIG. 2 illustrates an example process flow for processing a user request provided to a generative AI system.

FIG. 2 illustrates an example process flow for processing a user request provided to a generative AI system. In examples, process 200 is executed by an AI system, such as generative AI system 104. Process flow 200 commences as user device 102 receives a request to explain the cause of failure for a portion of software code ("failure explanation request"). In some embodiments, the failure explanation request is provided by a user that is analyzing an error file comprising or indicating a portion of software code that is associated with a detected issue in a software service or application. For instance, the user may be evaluating a memory dump indicating that the failure of a particular function in a software code file caused an application to terminate abnormally (or become inoperable) or contributed to an application terminating abnormally (or becoming inoperable). In other embodiments, the failure explanation request is provided by a user that is not analyzing an error file. For instance, the user may be reviewing a software code file comprising a portion of software code that the user knows to have failed or suspects to have failed. In another instance, the user may be interacting with a document or a communication (e.g., a summary report, an email message, or a chat message) in which the failure of the portion of software code is indicated.

In response to receiving the failure explanation request, user device 102 may identify an error file identifier that is used to identify a particular error file associated with the portion of software code. In some examples, the error file identifier is provided explicitly by the user as part of the failure explanation request. In other examples, user device 102 determines the error file identifier. For instance, while analyzing an error file using a user interface of a debugging application, a user may select or otherwise indicate a particular function in the error file. In response to the user selecting a user interface element that requests an explanation of the failure of the particular function, the user interface may identify the error file identifier based on an evaluation of the error file. For instance, the user interface may search the fields of the error file to locate a field comprising the error file identifier for the error file (e.g., a file name field).

User device 102 provides the failure explanation request (or an indication thereof) and, in some cases, the error file identifier to code failure explanation API 116. In the embodiment described in process 200, code failure explanation API 116 comprises context builder 202, mapping utility 204, code compiler 206, and instruction identifier 208. However, in other embodiments, one or more of context builder 202, mapping utility 204, code compiler 206, and instruction identifier 208 may be implemented (e.g., as an extension, an add-in, or other functionality) in a separate application, service, or system. For instance, mapping utility 204 may be implemented in an application used to analyze a detected issue in a software service or application, such as a debugging application used to analyze error files.

Code failure explanation API 116 provides the error file identifier received from user device 102 to security layer 210. Security layer 210 queries security store 112 to determine whether security store 112 comprises access information that allows the user to access the error file corresponding to the error file identifier. If security layer 210 determines that security store 112 does not comprise valid and/or current access information enabling the user to access the error file, security layer 210 prevents execution of the failure explanation request. However, if security layer 210 determines that security store 112 does comprise valid and/or current access information enabling the user to access the error file, security layer 210 provides an authorization confirmation ("error file authorization") to code failure explanation API 116.

Upon receipt by code failure explanation API 116 of the error file authorization from security layer 210, context builder 202 identifies error information (e.g., exception text, call stack information, and other debugging information) associated with the error file. In some examples, context builder 202 retrieves the error information from error information data store 108. In other examples, the error information is received from user device 102 as part of the failure explanation request. Using the error information, context builder 202 builds a context for the portion of software code indicated in the failure explanation request. Building the context comprises creating or identifying a data structure (e.g., a hash or array) or a file, and aggregating one or more portions of the error information into the data structure or file. In some examples, the context comprises at least an identifier of the portion of software code and a commit identifier associated with the portion of software code. In other examples, the context additionally or alternatively comprises a revision history for the portion of software code, software dependency relationships of portion of software code, call stack information or other event information, exception text associated with a detected issue, and/or the date/time of a detected issue.

The context for the portion of software code is provided to mapping utility 204. In examples, mapping utility 204 uses the context for the portion of software code and one or more symbol files associated with a software code file comprising the portion of software code to identify a storage location of the software code file. For instance, mapping utility 204 may use the memory addresses in a symbol file to identify the software code file name and class in which the portion of software code is located. Additionally, mapping utility 204 may compare a commit identifier in the context for the portion of software code with a commit identifier in a software code repository to identify the software code, project, branch, and/or version of the software code file comprising the portion of software code.

Upon identifying the location of the software code file, code failure explanation API 116 provides an identifier of the software code file and/or the location of the software code file to security layer 210. Security layer 210 queries security store 112 to determine whether security store 112 comprises access information that allows the user to access the software code file. If security layer 210 determines that security store 112 does not comprise valid and/or current access information enabling the user to access the software code file, security layer 210 prevents execution of the failure explanation request. However, if security layer 210 determines that security store 112 does comprise valid and/or current access information enabling the user to access the software code file, security layer 210 provides an authorization confirmation ("software code file authorization") to code failure explanation API 116.

Upon receipt by code failure explanation API 116 of the software code file authorization from security layer 210, code compiler 206 uses the identified storage location of the software code file to access the software code file. For example, code compiler 206 may retrieve the software code file from software code repository 110 or access the software code file stored in software code repository 110. Code compiler 206 identifies lines of software code in the software code file corresponding to the portion of software code. In some examples, code compiler 206 also identifies or extracts additional lines of software code surrounding the lines of software code corresponding to the portion of software code. For instance, code compiler 206 may extract lines of software code for a class comprising the portion of software code or lines of software code for the entire software code file. Code compiler 206 may provide the context and/or the lines of software code to instruction identifier 208.

Instruction identifier 208 identifies an instruction (e.g., a prompt or other information) corresponding to the failure explanation request. As one specific example, instruction identifier 208 may identify the following prompt: "Provide a natural language explanation of the software code provided below." In some examples, instruction identifier 208 identifies a prompt by selecting the prompt from an existing list of candidate prompts. For instance, each prompt in the list of candidate prompts may be mapped to or otherwise associated with a usage scenario (e.g., explain software code, explain failure of software code, explain solution to repair software code, provide solution to repair software code, or provide pull request for software code). A prompt may be selected from the list of candidate prompts based on a match between the determined intent for the failure explanation request and the usage scenario for the prompt. If multiple prompts in the list of candidate prompts are determined to be associated with a usage scenario, instruction identifier 208 may select one of the multiple prompts based on predefined criteria, such as the number of characters or lines in the identified lines of software code or previous feedback of the user. For instance, instruction identifier 208 may determine that, in previous failure explanation requests from the user, the user often provides multiple subsequent requests for additional information to supplement the explanations provided by language model 120. As a result, instruction identifier 208 may select the prompt that is intended to provide the most verbose or in-depth explanation.

In other examples, instruction identifier 208 identifies a prompt by dynamically generating the prompt in response to receiving the context and/or the lines of software code from code compiler 206. For instance, instruction identifier 208 may analyze the failure explanation request using semantic analysis techniques to identify terms in the failure explanation request and/or an intent for the failure explanation request. In at least one example, the semantic analysis techniques involve the use of machine learning algorithms to perform a lexical semantic analysis to determine the meaning of each of the terms in the failure explanation request individually, performing word sense disambiguation to determine the context of each term based on the context of the term's occurrence within the failure explanation request, and/or performing relationship extraction to identify entities in the failure explanation request and relationships between the identified entities. Based on the semantic analyses, an intent classification is performed to determine the intent of the failure explanation request using intent and/or sentiment analysis algorithms, such as linear regression, Naïve Bayes, support vector machines, and recurrent neural networks.

Based on the analysis of the failure explanation request, instruction identifier 208 generates (e.g., in real-time) a prompt comprising terms matching or related (semantically or topically) to terms in the failure explanation request. In some examples, instruction identifier 208 generates multiple prompts that are at least slightly different in scope. For instance, instruction identifier 208 may generate a first prompt that is intended to elicit a high-level response (e.g., a response that is summary in nature and omits detailed description) and a second prompt that is intended to elicit a low-level response (e.g., a response that is detailed in nature and includes explanations of concepts, acronyms, and/or obscure terms). Instruction identifier 208 may provide each of the multiple prompts as options to the user. Upon receiving a selection of a prompt from the user, instruction identifier 208 selects the user-selected prompt. In some examples, instruction identifier 208 records the selection of the user-selected prompt and uses the recorded selection to inform subsequent determinations of prompts to generate and/or provide to the user.

In yet other examples, instruction identifier 208 does not identify a prompt. For instance, in one embodiment, language model 120 does not require or accept a prompt from instruction identifier 208. Instead, instruction identifier 208 formats (or provide instructions for formatting) the context and/or the lines of software code received from code compiler 206 to a format expected by language model 120. For instance, instruction identifier 208 verifies that the lines of software code do not exceed a maximum line limit and verifies that the context and the lines of software code do not collectively exceed a maximum token limit. In another instance, instruction identifier 208 creates (or provide instructions for creating) vector representations of the context and/or the lines of software code. Additionally, instruction identifier 208 may ensure that the context and the lines of software code each adhere to a respective data schema and are provided in a certain sequence to language model 120. In such examples, although language model 120 does not require or accept a prompt from instruction identifier 208, language model 120 may require or accept a prompt from a different source. For instance, as part of or in response to formatting performed by instruction identifier 208, a separate service that is internal to or external to the AI system executing process 200 may provide a prompt relating to the failure explanation request to language model 120.

In another embodiment, instruction identifier 208 identifies information that is not a prompt. For instance, instead of identifying a prompt comprising a statement or a request intended for language model 120, instruction identifier 208 identifies other information relating to the context, the lines of software code, and/or the software service or application experiencing the detected issue. As one example, instruction identifier 208 identifies a creation timestamp for the context, line numbers of interest in the lines of software code, and/or one or more previous incident reports for the software service or application experiencing the detected issue. In another instance, language model 120 includes a hard-coded prompt for which users are expected to provide values for one or more parameters in the hard-coded prompt. As one example, instruction identifier 208 may provide, via a user interface, a request for prompt parameters to a user that provided the failure explanation request. Such prompt parameters may include, for example, a knowledge level of the user with particular topics, a desired level of detail for an answer or output, a desired length for an answer or output, or a data source to query.

Code failure explanation API 116 provides the context for the portion of software code, the lines of software code from the software code file, and the instruction corresponding to the failure explanation request to language model 120. In some examples, code failure explanation API 116 also provides one or more previous dialogue entries between the user and language model 120 to language model 120. For instance, during a previous turn of an ongoing conversation between a user and language model 120, the user provided a first request to language model 120 to provide an explanation of the portion of software code. In this instance, the first request invoked code explanation API 114. In response to the first request, language model 120 provided an explanation of the portion of software code. In the current turn of the ongoing conversation, the user provides a second request (i.e., the failure explanation request) to language model 120. Code failure explanation API 116 obtains the dialogue entries from the previous turn of the ongoing conversation (e.g., the request from the user and the response from language model 120). For instance, code failure explanation API 116 may retrieve the dialogue entries from a dialogue history log maintained by language model 120 or a user request log maintained by the generative AI system. In examples, providing the previous dialogue entries to language model 120 enables language model 120 to process current requests within the context of the previous dialogue entries to simulate an ongoing conversation.

Language model 120 processes the input received from code failure explanation API 116 and generates output that is responsive to the code failure request. For example, language model 120 generates a natural language explanation of the cause of failure for the portion of software code based on an analysis by language model 120 of the context for the portion of software code and the lines of software code from the software code file. Language model 120 then provides the output to code failure explanation API 116, which, in turn, provides the output to user device 102. Alternatively, language model 120 may provide the output directly to user device 102. In either scenario, providing the output to user device 102 terminates process flow 200.

Figure 3A:
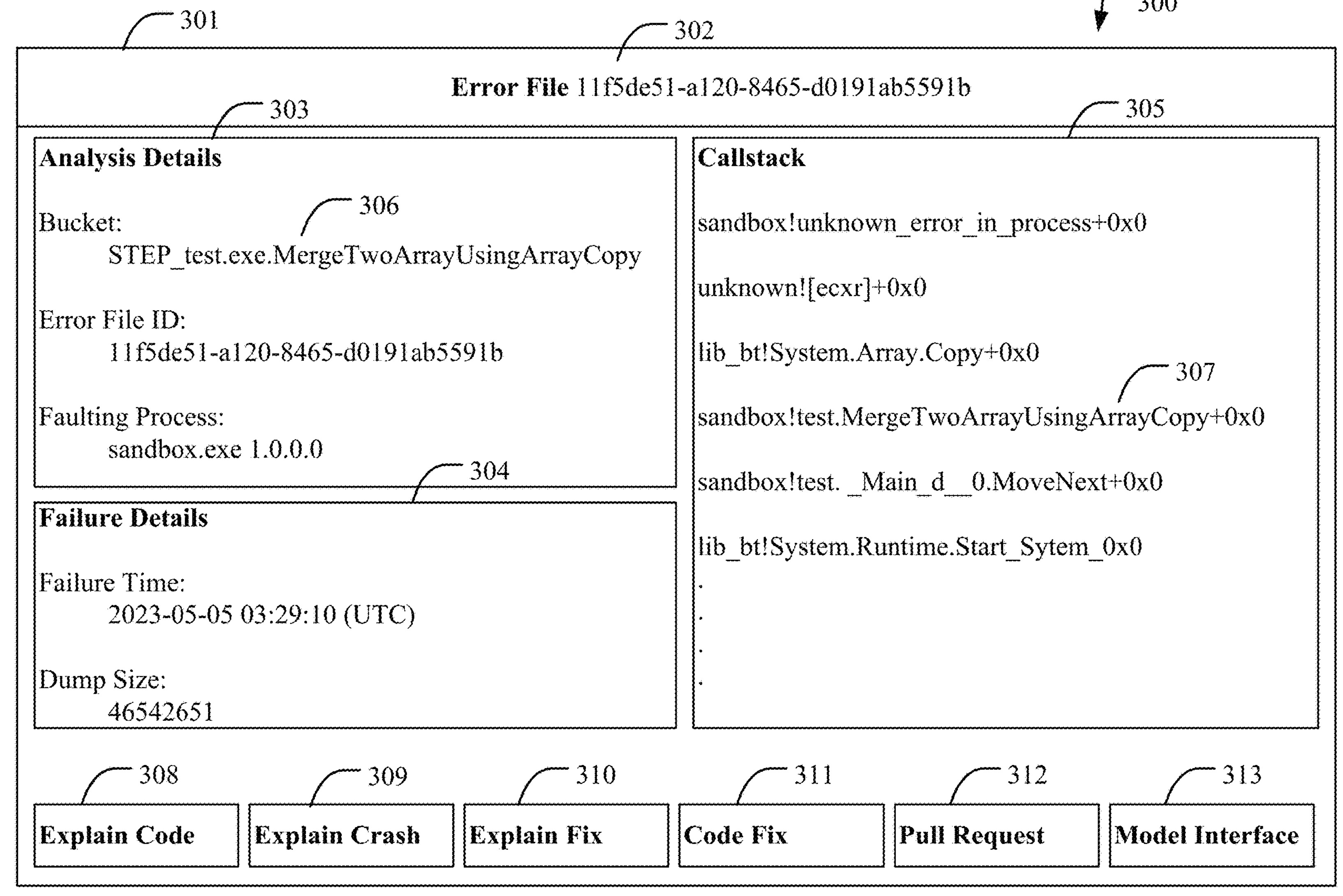
FIGS. 3A-3F illustrate example user interfaces associated with uses of the generative AI system discussed herein.

FIGS. 3A-3F are illustrations of user interfaces associated with uses of generative AI system 104. FIG. 3A illustrates a user interface 300 that is used to analyze a detected issue in a software service or application. User interface 300 displays an error file 301. Error file 301 includes error file identifier 302, analysis details section 303, failure details section 304, and call stack section 305. Analysis details section 303 includes exception text 306, which identifies a portion of software code (e.g., the 'MergeTwoArraysUsingArrayCopy' function) that has caused or contributed to a detected issue. Call stack section 305 includes a list of functions and subroutines that were executing prior to (or during) the detected issue. The list of functions and subroutines includes call stack entry 307, which corresponds to the portion of software code. User interface 300 includes 'Explain Code' user interface element 308, 'Explain Crash' user interface element 309, 'Explain Fix' user interface element 310, 'Code Fix' user interface element 311, 'Pull Request' user interface element 312, and 'Model Interface' user interface element 313. In examples, 'Explain Code' user interface element 308 invokes code explanation API 114; 'Explain Crash' user interface element 309 invokes code failure explanation API 116; 'Explain Fix' user interface element 310, 'Code Fix' user interface element 311, and 'Pull Request' user interface element 312 invoke code repair API 118; and 'Model Interface' user interface element 313 invokes a command line interface to language model 120.

Figure 3B:
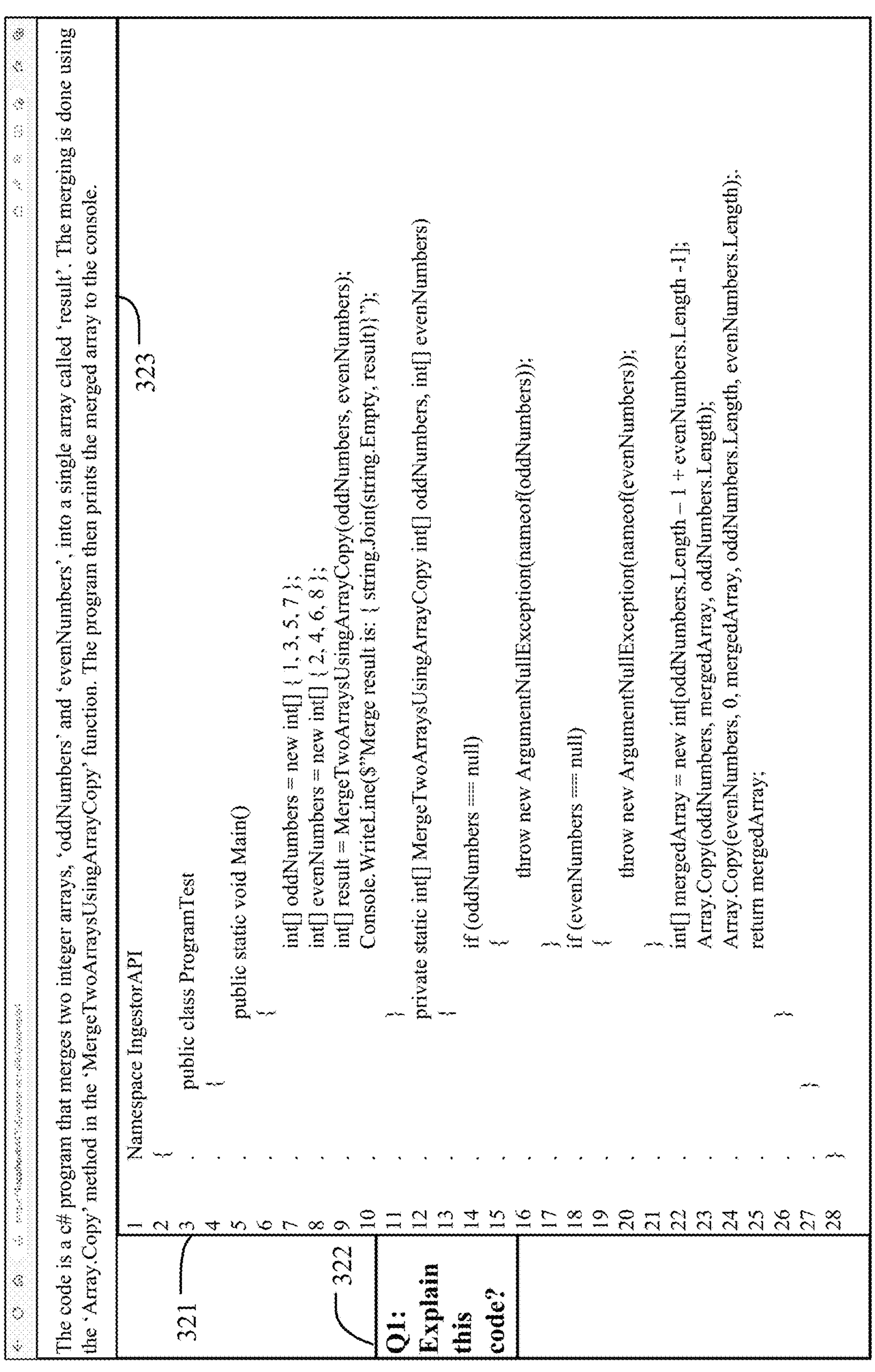

FIG. 3B illustrates a user interface 320 that is used to review software code. User interface 320 displays software code 321, request 322, and answer 323. In examples, software code 321 represents lines of software code associated with the portion of software code identified in FIG. 3A (e.g., the 'MergeTwoArraysUsingArrayCopy' function). Request 322 represents a user request to explain the portion of software code. For instance, user interface 320 may include 'Explain Code' user interface element 308 or 'Model Interface' user interface element 313. While reviewing software code 321, the user may select 'Explain Code' user interface element 308 or enter a request into 'Model Interface' user interface element 313. As a result, a request may be provided to language model 120. Answer 323 represents a response by language model 120 to request 322.

Figure 3C:
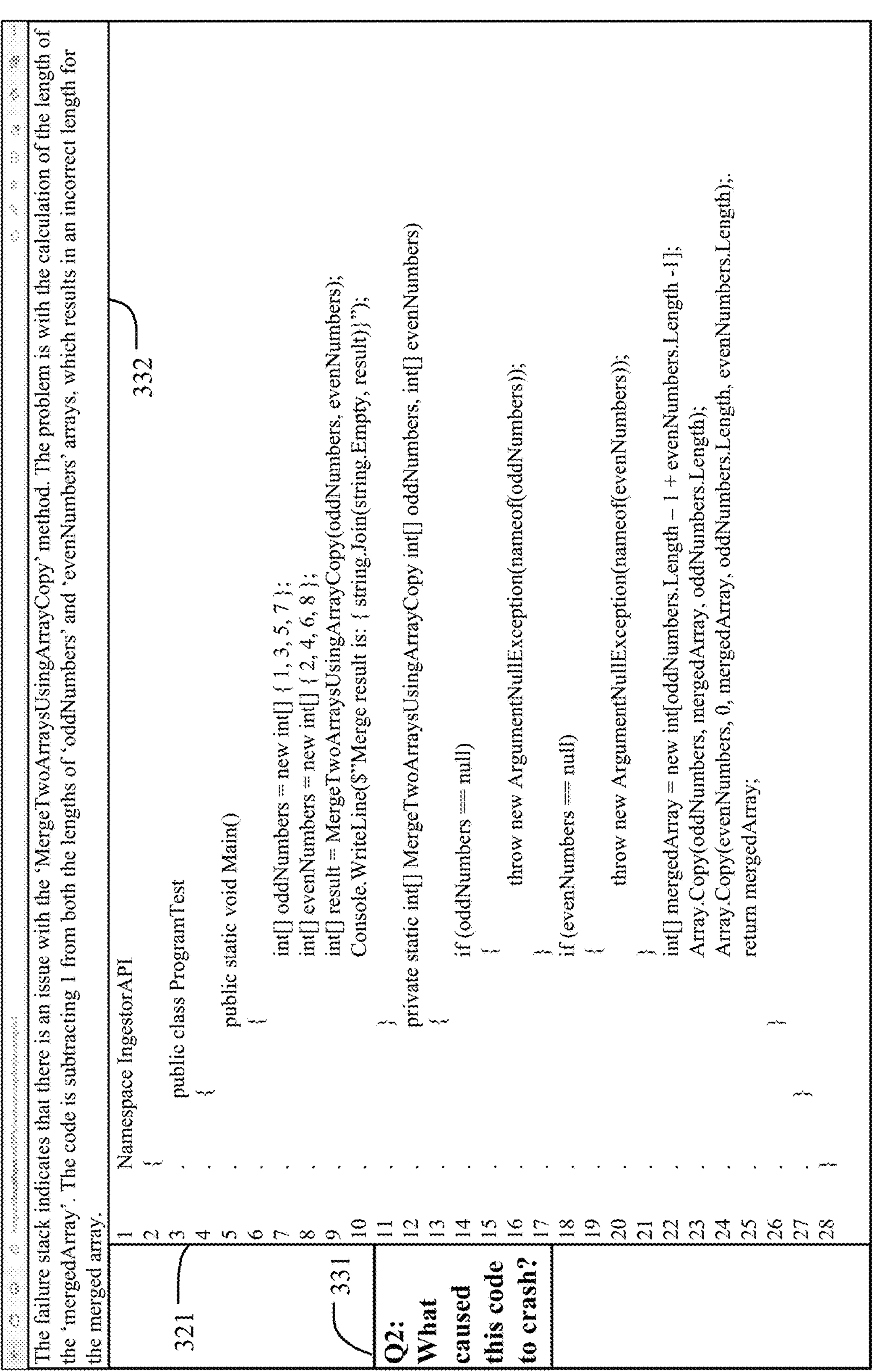

FIG. 3C illustrates a user interface 330. In examples, user interface 330 represents a continuation of the dialogue in FIG. 3B between a user and language model 120. User interface 330 displays software code 321, request 331, and answer 332. Request 331 represents a user request to explain the cause of failure of the portion of software code identified in FIG. 3A (e.g., the 'MergeTwoArraysUsingArrayCopy' function). For instance, user interface 330 may include 'Explain Crash' user interface element 309 or 'Model Interface' user interface element 313, one of which may be selected by a user. Answer 332 represents a response by language model 120 to request 331.

Figure 3D:
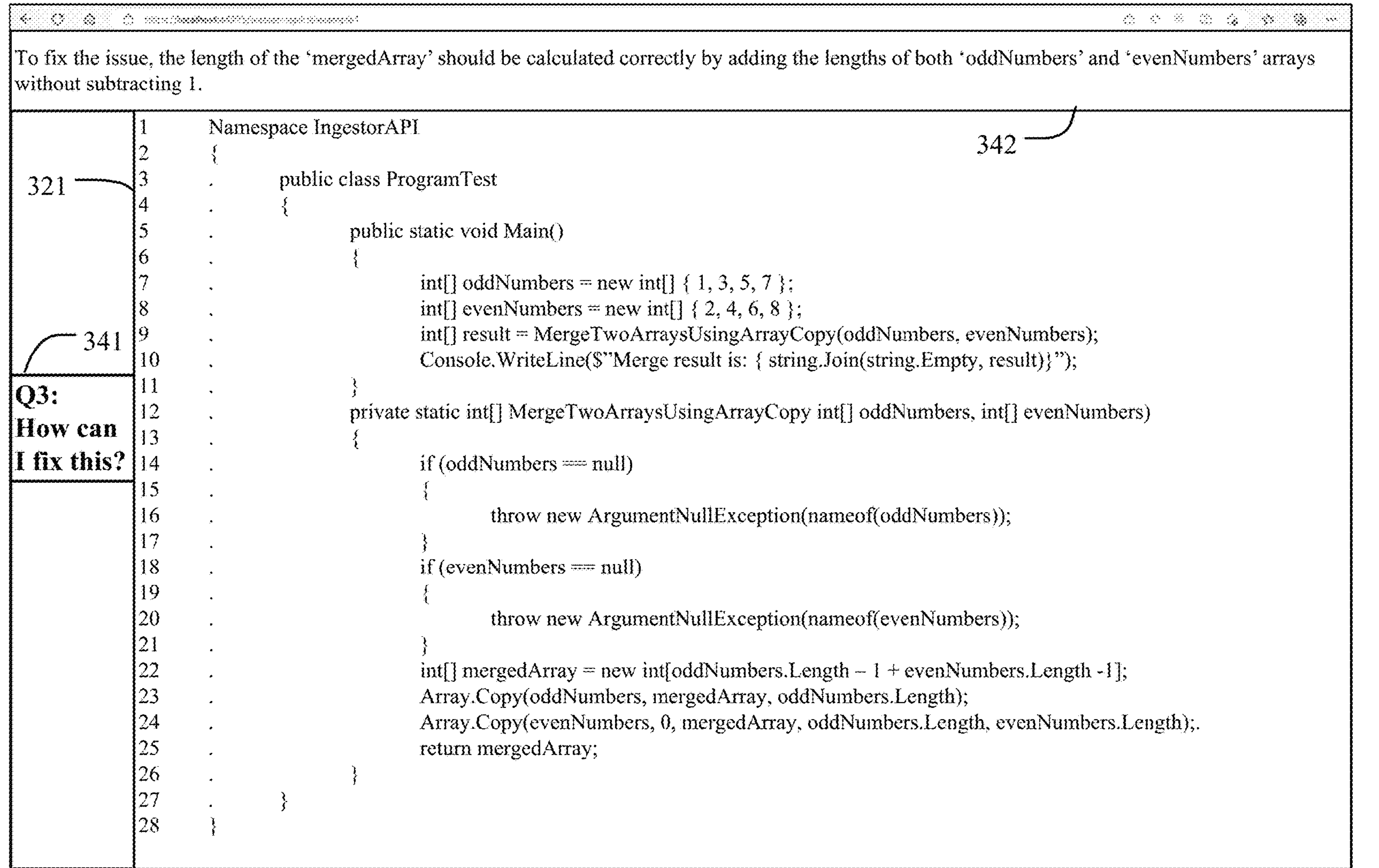

FIG. 3D illustrates a user interface 340. In examples, user interface 340 represents a continuation of the dialogue in FIG. 3C between a user and language model 120. User interface 340 displays software code 321, request 341, and answer 342. Request 341 represents a user request to explain a proposed solution to repair the portion of software code identified in FIG. 3A (e.g., the 'MergeTwoArraysUsingArrayCopy' function). For instance, user interface 340 may include 'Explain Fix' user interface element 310 or 'Model Interface' user interface element 313, one of which may be selected by a user. Answer 342 represents a response by language model 120 to request 341.

Figure 3E:
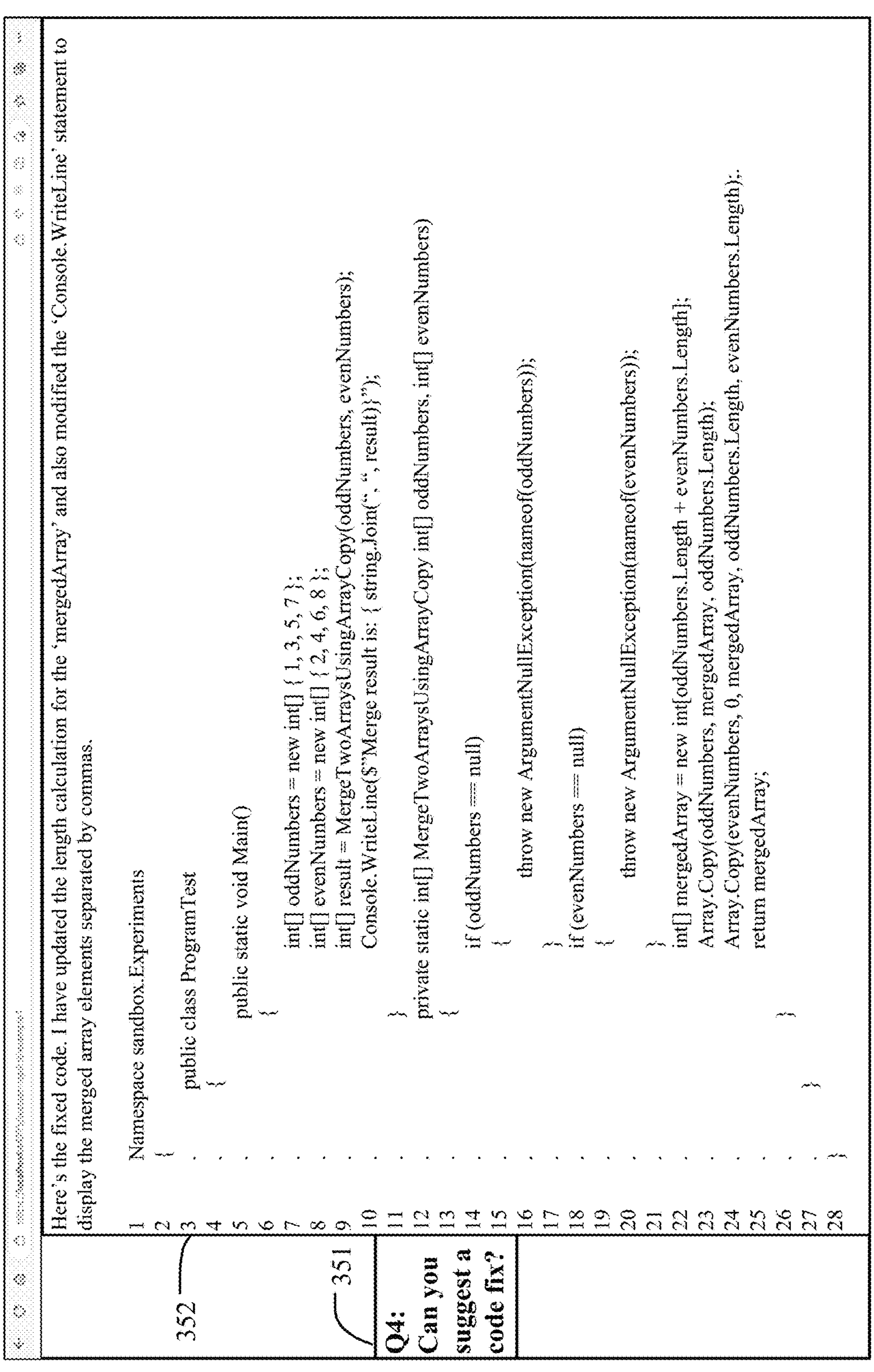

FIG. 3E illustrates a user interface 350. In examples, user interface 350 represents a continuation of the dialogue in FIG. 3D between a user and language model 120. User interface 350 displays request 351 and software code 352. Request 351 represents a user request for a proposed solution to repair the portion of software code identified in FIG. 3A (e.g., the 'MergeTwoArraysUsingArrayCopy' function). For instance, user interface 350 may include 'Code Fix' user interface element 311 or 'Model Interface' user interface element 313, one of which may be selected by a user. Software code 352 represents a response by language model 120 to request 351. As shown, software code 352 is a modified version of software code 321 and include a summary of the modifications made to software code 321 to produce software code 352.

Figure 3F:
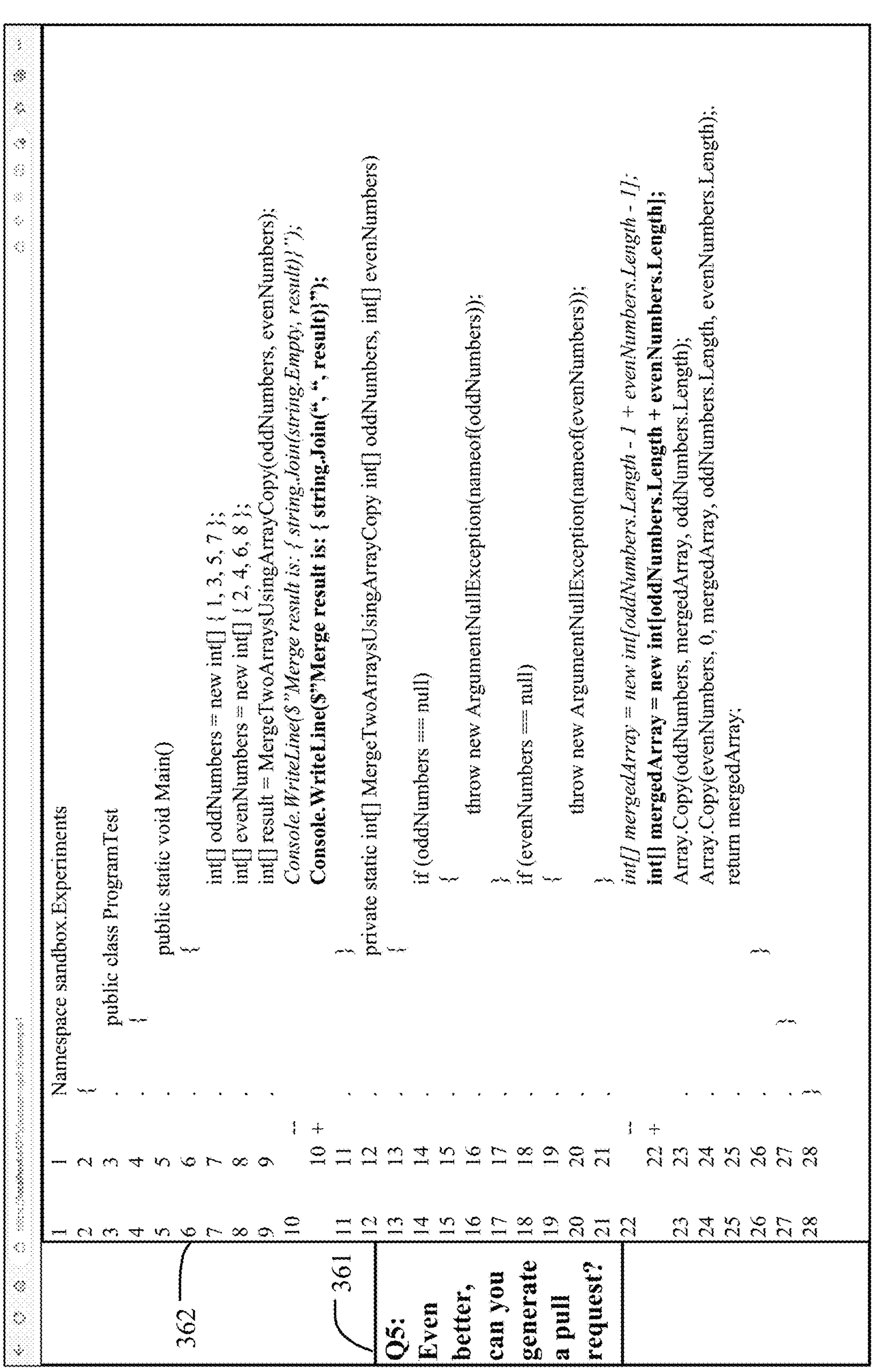

FIG. 3F illustrates a user interface 360. In examples, user interface 360 represents a continuation of the dialogue in FIG. 3E between a user and language model 120. User interface 360 displays request 361 and software code 362. Request 361 represents a user request for a pull request for a repaired version the portion of software code identified in FIG. 3A (e.g., the 'MergeTwoArraysUsingArrayCopy' function). For instance, user interface 360 may include 'Pull Request' user interface element 312 or 'Model Interface' user interface element 313, one of which may be selected by a user. Software code 362 represents a response by language model 120 to request 361. Software code 362 illustrates the differences between software code 321 and software code 352.

Having described a system that may be employed by the embodiments disclosed herein, a method that may be performed by such systems is now provided. Although method 400 is described in the context of system 100 of FIG. 1, the performance of method 400 is not limited to such examples.

Figure 4:
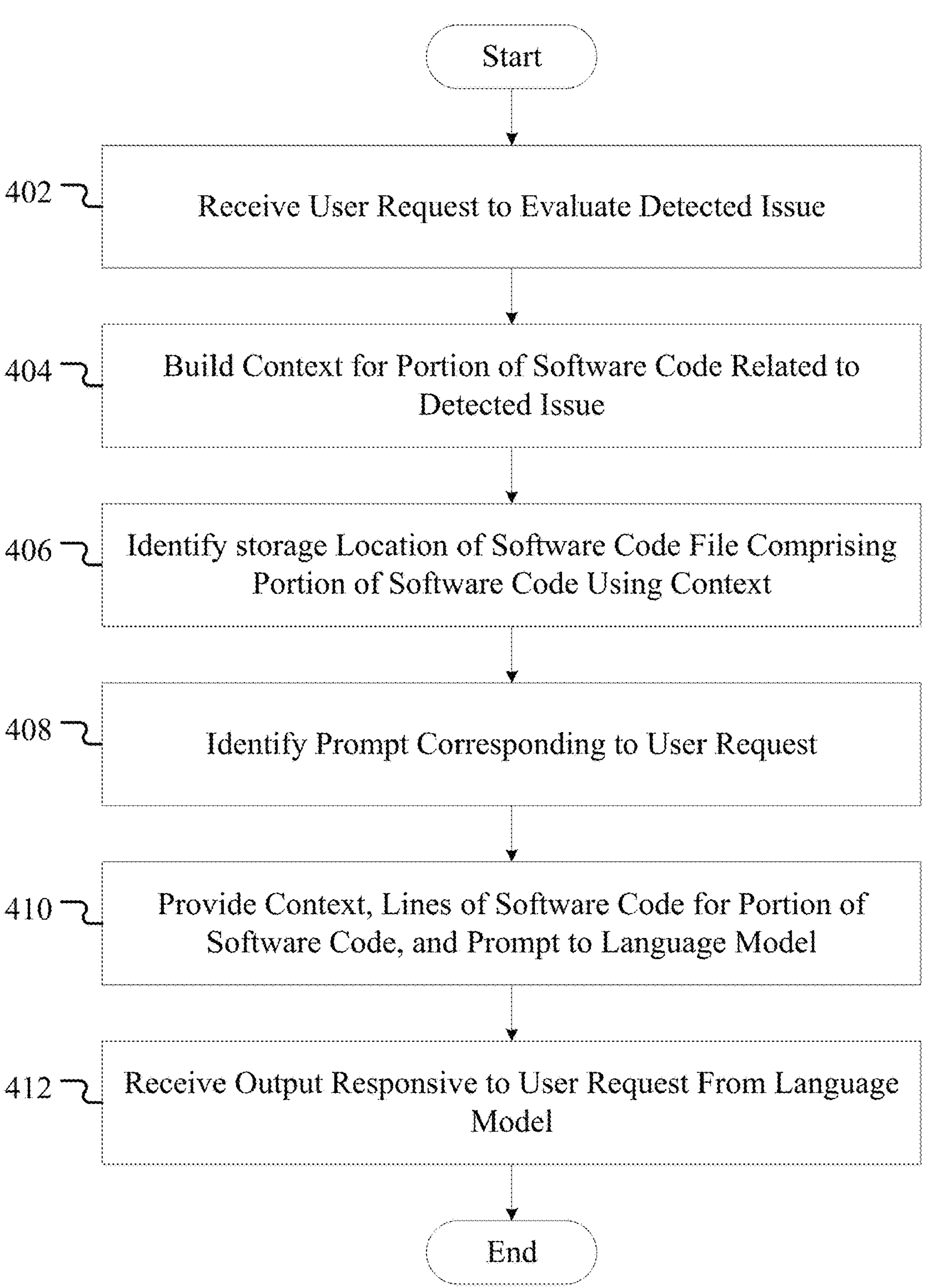
FIG. 4 illustrates an example method for automatically detecting and repairing reliability issues in operating systems and applications using a generative AI system.

FIG. 4 illustrates a method 400 for automatically detecting and repairing reliability issues in operating systems and applications using a generative AI system. Method 400 begins at operation 402, where a generative AI system, such as generative AI system 104, receives a user request to evaluate a detected issue in a software service or application. For example, a user of user device 102 may request the generative AI system to explain the intent of a portion of software code, to explain the cause of failure of a portion of software code, to explain a proposed solution to repair a portion of software code, to provide a proposed solution to repair a portion of software code, or to provide a pull request associated with a proposed solution to repair a portion of software code.

At operation 404, the generative AI system builds a context for a portion of software code that caused or contributed to the detected issue. In some examples, a user provides the identity of the portion of software code as part of the user request. In other examples, the identity of the portion of software code is determined by a software component that is invoked in response to receiving the user request. For instance, a user request may invoke at least one of code explanation API 114, code failure explanation API 116, or code repair API 118. The invoked API(s) may then determine the identity of the portion of software code based on content provided in a user interface or metadata associated with the content. Determining the identity of the portion of software code may include identifying an in-focus portion of the user device (e.g., an application, a window, or a section of the user device that is currently in the foreground and/or is actively being used) and searching the in-focus portion for an identifier corresponding to the portion of software code. As a specific example, code explanation API 114, code failure explanation API 116, or code repair API 118 is invoked in a user interface of a debugging program being used to view an error file for a crash event experienced by an application. Upon invoking the API, the API causes the fields and corresponding values for the error file that was in-focus in the debugging application at the time the API was invoked to be collected. The API then searches the collected fields and values to locate a field and a corresponding value identifying the portion of software code that caused the error file to be generated. In examples, building the context comprises identifying information associated with the portion of software code. The information may include error information (e.g., exception text, call stack information, and other debugging information) and/or other identifying information, such as a storage location of a source code file comprising the portion of software code. The information is then aggregated into a data structure or a file to build the context.

At operation 406, the generative AI system uses the context to identify the storage location of a software code file comprising the portion of the software code. In examples, the storage location of a software code file is located using the context and one or more symbol files associated with the software service or application that is experiencing the detected issue. For instance, a commit identifier in the context and memory addresses in the symbol files may be used to identify the correct version of a software code file among several branches of a codebase. Upon identifying the storage location of a software code file, the generative AI system identifies or extracts the lines of software code corresponding to the portion of software code. In some examples, the generative AI system also identifies or extracts additional lines of software code surrounding the lines of software code corresponding to the portion of software code.

At operation 408, the generative AI system identifies a prompt corresponding to the user request. In some examples, identifying the prompt includes selecting the prompt from an existing list of candidate prompts based on the user request, the context, and/or the lines of software code. For instance, each prompt in the list of candidate prompts may be mapped to or otherwise associated with a usage scenario corresponding to the user request, the context, or the lines of software code. A prompt may be selected from the list of candidate prompts based on a match between the usage scenario and terms in, or a determined intent for, the user request. The existing list of candidate prompts may be predefined by a user, such as a developer or an administrator. Alternatively, the existing list of candidate prompts may be generated over time by the generative AI system based on user feedback and/or the insights determined by the generative AI system. For instance, based on explicit (or implied) user satisfaction with one or more prompts having at least slightly different scopes, the generative AI system may supplement the list of candidate prompts over time with prompts that provide the highest level (or a threshold level) of user satisfaction. In other examples, the generative AI system identifies a prompt by dynamically generating the prompt in response to receiving the user request. For instance, the generative AI system may use semantic analysis techniques to identify terms in and/or the intent of the user request. The identified terms or intent may then be used to reformat the user request into an optimal prompt or to generate a prompt that is more effective than the user request.

At operation 410, the generative AI system provides the context, the lines of software code, and/or the prompt as input to a language model, such as language model 120. For example, the generative AI system may organize the context, the lines of software code, and the prompt into a format expected by the language model. The generative AI system may also provide the context, the lines of software code, and the prompt in a particular sequence to the language model. For instance, the prompt may indicate a request to analyze "the following software code in light of the context following the software code." As a result, the generative AI may provide the prompt to the language model, followed by the lines of software code, followed by the context. In some examples, the generative AI system may also provide one or more previous dialogue entries between the user and the language model to the language model. For instance, during a first turn in the dialogue between the user and the language model, the user requests the language model to explain the intent of portion of software code and the language model provides a corresponding response. During a second turn in the dialogue, the user requests the language model to explain the cause of the failure of the same portion of software code. In response to the request during the second turn in the dialogue, the generative AI system retrieves the request and response from the first turn in the dialogue, as well as the context and the lines of software code from the first turn in the dialogue. The generative AI system then provides the request, the response, the context, and the lines of software code from the first turn in the dialogue along with a prompt for the second turn in the dialogue to the language model.

At operation 412, the generative AI system receives output from the language model that is responsive to the user request. In examples, the language model processes the received context, the lines of software code, and/or the previous dialogue entries in accordance with the received prompt. The language model then outputs a response for the user request. For instance, the response may include an explanation of the intent of portion of software code, an explanation of the cause of failure for the portion of software code, an explanation of a proposed solution to repair the portion of software code, a proposed solution to repair the portion of software code, or a pull request for a repaired version of the portion of software code. In some examples, language model also outputs one or more test cases intended to be used to test a repaired version of the portion of software code. The generative AI system then provides the response to the requestor of the user request for use in resolving or triaging the detected issue in the software service or application.

Figure 5:
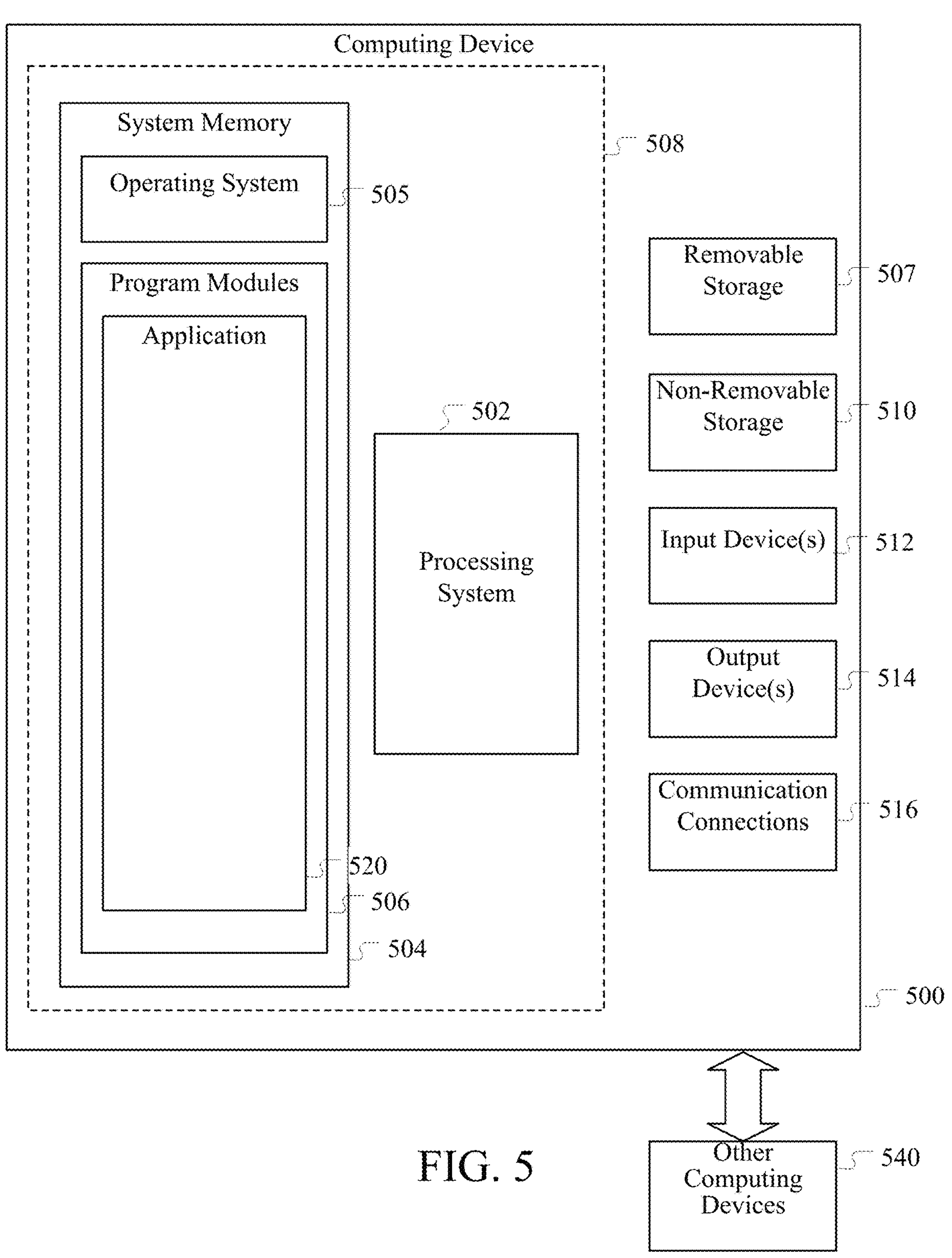
FIG. 5 is a block diagram illustrating example physical components of a computing device for practicing aspects of the disclosure.

FIG. 5 is a block diagram illustrating physical components (e.g., hardware) of a computing device 500 with which aspects of the disclosure may be practiced. The computing device components described below may be suitable for the computing devices and systems described above. In a basic configuration, the computing device 500 includes at least one processing system 502 and a system memory 504. Depending on the configuration and type of computing device, the system memory 504 comprises volatile storage (e.g., random access memory (RAM)), non-volatile storage (e.g., read-only memory (ROM)), flash memory, or any combination of such memories.

The system memory 504 includes an operating system 505 and one or more program modules 506 suitable for running software application 520, such as one or more components supported by the systems described herein. The operating system 505, for example, is suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, or optical disks. Such additional storage is illustrated in FIG. 5 by a removable storage device 507 and a non-removable storage device 510.

As stated above, a number of program modules and data files may be stored in the system memory 504. While executing on the processing system(s) 502, the program modules 506 (e.g., application 520) may perform processes including the aspects described herein. Other program modules that may be used in accordance with aspects of the present disclosure include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing systems/units, graphics units, communications units, system virtualization units and various application functionality all of which are integrated (or "burned") onto the chip substrate as a single integrated circuit. When operating via an SOC, the functionality described herein with respect to the capability of a client to switch protocols, may be operated via application-specific logic integrated with other components of the computing device 500 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 500 also has one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 507, and the non-removable storage device 510 are all computer storage media examples (e.g., memory storage). Computer storage media includes RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

As will be understood from the present disclosure, one example of the technology discussed herein relates to a system comprising: a processing system; and memory coupled to the processing system, the memory comprising computer executable instructions that, when executed, perform operations comprising: receiving a request to evaluate a detected issue in a software service or application; building a context for a portion of software code that caused or contributed to the detected issue, wherein the context comprises error information corresponding to a failure of the portion of software code; based on the context, identifying a storage location of a software code file comprising the portion of software code; identifying an instruction corresponding to the request; providing as input to a language model: the context; lines of software code corresponding to the portion of software code, wherein the lines of software code are extracted from the software code file; and the instruction; receiving, from the language model, output responsive to the user request; and providing the output to a requestor of the request.

In another example, the technology discussed herein relates to a method comprising: receiving a request to evaluate a detected issue in software code; building a context for a portion of the software code that caused or contributed to the detected issue, wherein the context comprises error information corresponding to a failure of the portion of the software code; based on the context, identifying a storage location of a software code file comprising the portion of the software code; identifying an instruction corresponding to the request; providing as input to a language model: the context; lines of software code from the software code file; and the instruction; and receiving, from the language model, output responsive to the request.

In another example, the technology discussed herein relates to a device comprising: a processing system; and memory coupled to the processing system, the memory comprising computer executable instructions that, when executed, perform operations comprising: building a context for a portion of software code that caused or contributed to a detected issue in software code, wherein the context indicates error information associated with the portion of software code; identifying lines of software code corresponding to the portion of software code in a software code file; providing as input to a language model: the context; and the lines of software code corresponding to the portion of software code; and receiving, from the language model, output associated with detecting or repairing the portion of software code.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, it is envisioned that variations, modifications, and alternate aspects fall within the spirit of the broader aspects of the general inventive concept embodied in this application do not depart from the broader scope of the claimed disclosure.

What is claimed is:

1. A system comprising:
a processing system; and
memory comprising computer executable instructions that, when executed, perform operations comprising:
receiving a user request to evaluate a detected issue in a software service or application;
building a context for a portion of software code that caused or contributed to the detected issue, wherein the context comprises error information corresponding to a failure of the portion of software code;
based on the context, identifying a storage location of a software code file comprising the portion of software code;
identifying an instruction corresponding to the user request by selecting a prompt from a predefined list of candidate prompts based on a match between a term in the user request and a corresponding term in the prompt, wherein each prompt in the predefined list of candidate prompts is mapped to a usage scenario or at least one term;
providing as input to a language model:
the context;
lines of software code corresponding to the portion of software code, wherein the lines of software code are extracted from the software code file; and
the instruction;
receiving, from the language model, output responsive to the user request;
generating a repaired version of the portion of software code, wherein the repaired version of the portion of software code includes an indication of lines of software code that have been modified; and
causing the repaired version of the portion of software code to replace or modify the portion of software code.

2. The system of claim 1, wherein the instruction corresponds to a prompt that indicates an intention of the user request.

3. The system of claim 1, wherein receiving the user request comprises:
an application programming interface (API) that includes a set of instructions for providing a natural language explanation of indicated software code; and
executing the set of instructions to provide the natural language explanation of the indicated software code.

4. The system of claim 1, wherein receiving the user request comprises:
an application programming interface (API) that includes a set of instructions for providing a natural language explanation of a cause of failure for indicated software code; and
executing the set of instructions to provide the natural language explanation of the cause of failure for the indicated software code.

5. The system of claim 1, wherein receiving the user request comprises:
an application programming interface (API) that includes a set of instructions for providing a natural language explanation of a proposed solution to repair indicated software code; and
executing the set of instructions to provide the natural language explanation of the proposed solution to repair the indicated software code.

6. The system of claim 1, further comprising:
a software code repair application programming interface (API) that enables requesting a solution to repair indicated software code.

7. The system of claim 6, wherein the solution received from the software code repair API includes the repaired version of the indicated software code.

8. The system of claim 6, further comprising:
a pull request application programming interface (API) that enables requesting a pull request associated with the indicated software code.

9. The system of claim 8, wherein, in response to the pull request, the pull request API provides the pull request and software test for testing the indicated software code.

10. The system of claim 1, wherein building the context for the portion of software code comprises identifying the error information in an error file associated with the portion of software code.

11. The system of claim 10, wherein the error file is a memory dump file.

12. The system of claim 10, wherein the error file is an incident report or an event log.

13. The system of claim 1, wherein receiving the user request to evaluate the detected issue comprises receiving an identifier of the portion of software code.

14. The system of claim 1, wherein building the context for the portion of software code comprises:
receiving the user request at an application programming interface (API) for evaluating the detected issue; and
identifying, by the API, an identifier of the portion of software code based on metadata associated with the portion of software code, the metadata being provided by a user interface comprising the API.

15. The system of claim 1, wherein the error information includes at least one of exception text associated with a failure of the portion of software code or call stack information associated with the failure of the portion of software code.

16. A method comprising:
receiving a request to evaluate a detected issue in software code;
building a context for a portion of the software code that caused or contributed to the detected issue, wherein the context comprises error information corresponding to a failure of the portion of the software code;
based on the context, identifying a storage location of a software code file comprising the portion of the software code by evaluating the context and one or more symbol files associated with the software code;
identifying an instruction corresponding to the request by identifying a prompt based on at least one of:
the request;
the context; or
lines of the portion of software code;
providing as input to a language model:
the context;
lines of software code from the software code file; and
the instruction;
receiving, from the language model, output responsive to the request;
based on the output, generating a repaired version of the portion of software code; and
causing the repaired version of the portion of software code to replace or modify the portion of software code.

17. The method of claim 16, wherein the language model is a large language model (LLM) that is a generative artificial intelligence (AI) model.

18. The method of claim 16, wherein identifying the prompt comprises:

determining a meaning of at least one term in the request by performing a lexical semantic analysis of the request;

determining an intent of the request by performing intent classification based on the lexical semantic analysis; and dynamically generating the prompt based on determining the intent of the request, wherein the prompt comprises one or more terms matching are semantically related to the at least one term in the request.

19. A device comprising:

a processing system; and memory comprising computer executable instructions that, when executed, perform operations comprising:

receiving a user request to evaluate a detected issue in a software code;

building a context for a portion of software code that caused or contributed to the detected issue, wherein the context indicates error information associated with the portion of software code;

identifying lines of software code corresponding to the portion of software code in a software code file;

selecting an instruction from an existing list of candidate instructions based on a match between a term in the user request and a corresponding term in the instruction, wherein each instruction in the existing list of candidate instructions is mapped to a usage scenario providing as input to a language model:

the context;

the lines of software code corresponding to the portion of software code; and the instruction;

receiving, from the language model, output associated with detecting or repairing the portion of software code;

generating revised software code based on the output, wherein the revised software code is used to repair the portion of software code; and causing the revised software code to replace or modify the portion of software code.

20. The device of claim 19, wherein repairing the portion of software code comprises:

generating a pull request based on the revised software code; and executing the pull request to address the detected issue, wherein executing the pull request replaces or modifies the portion of software code using the revised software code.

* * * * *